March 13, 1962 F. P. SOLLINGER 3,024,600
EXHAUST NOZZLE ACTUATOR
Filed July 22, 1959 3 Sheets-Sheet 3
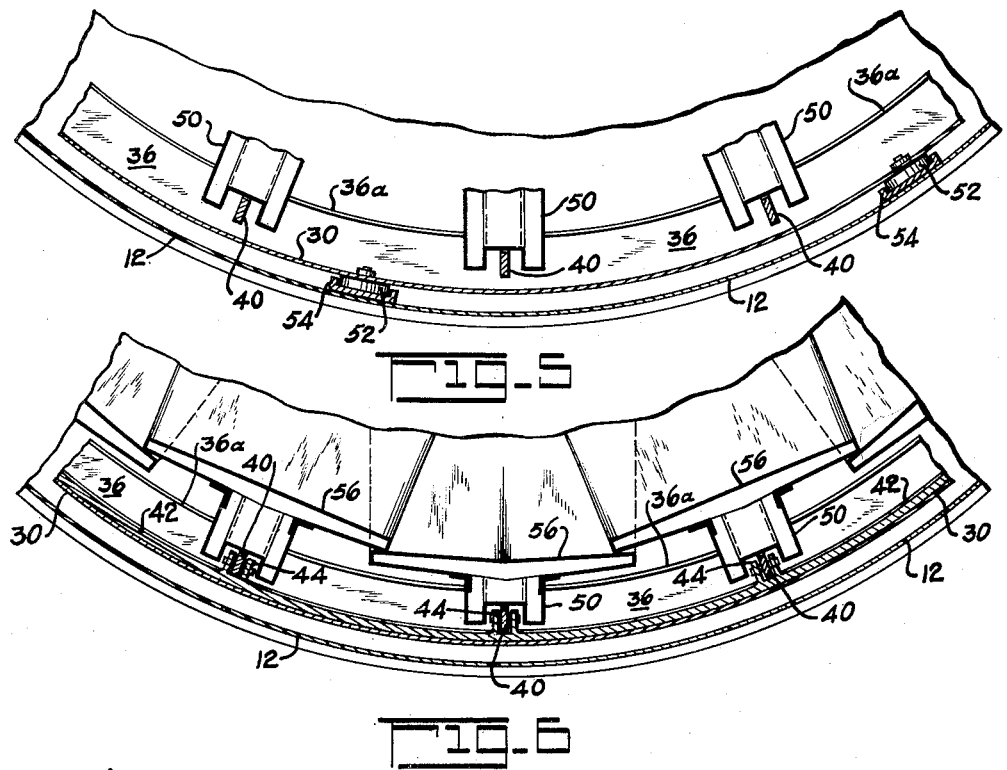
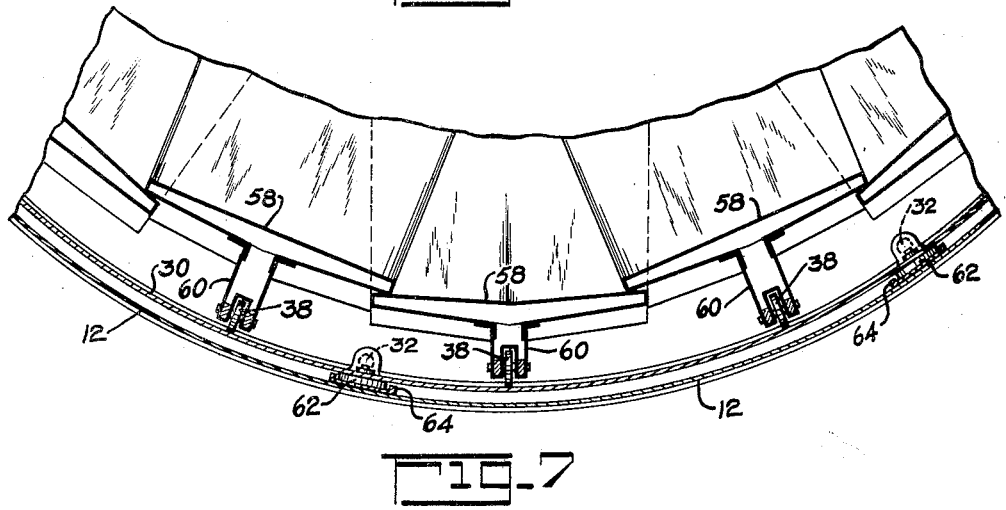
INVENTOR.
FERDINAND P. SOLLINGER
BY
Nathaniel Ely
ATTORNEY

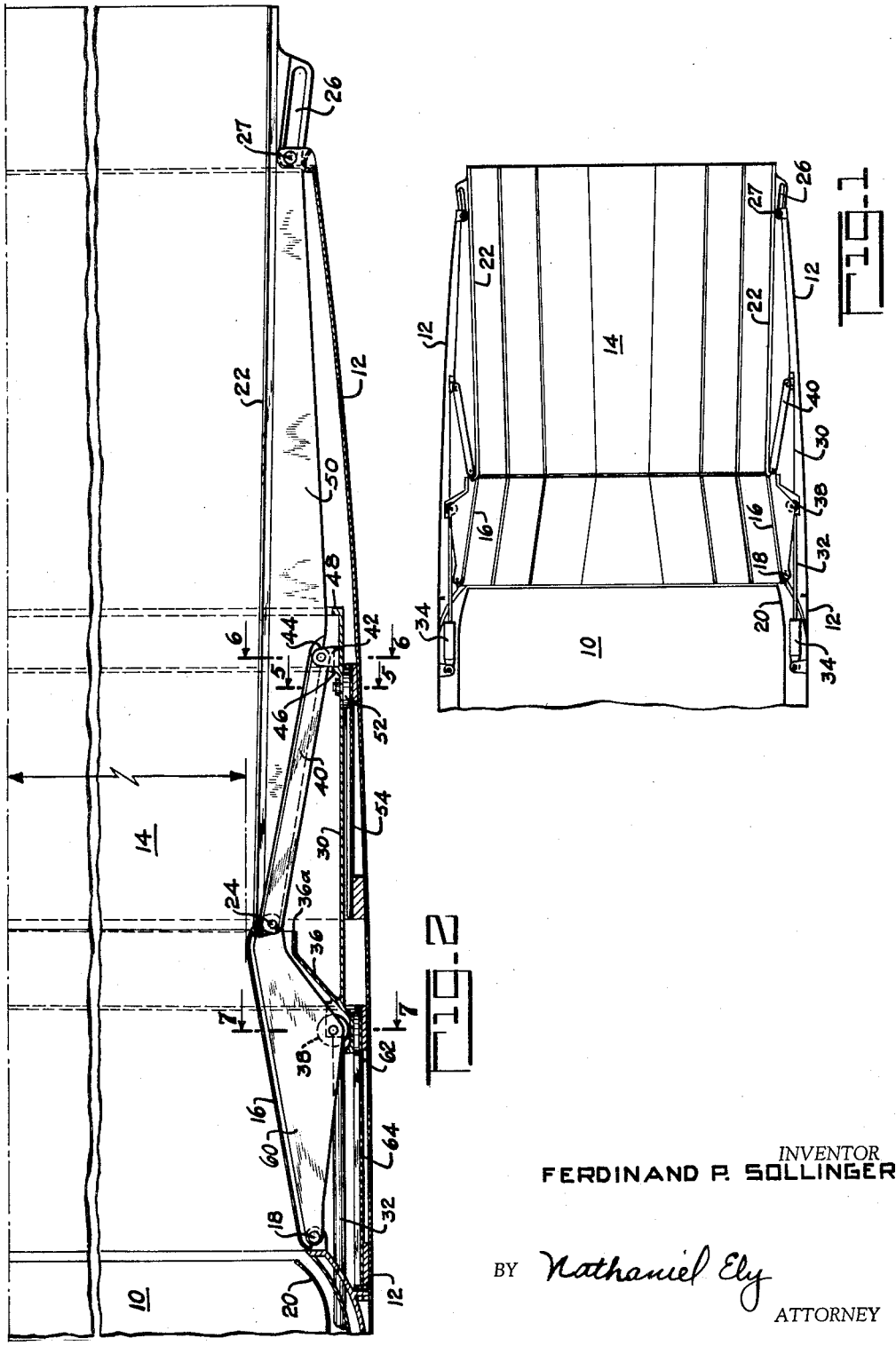

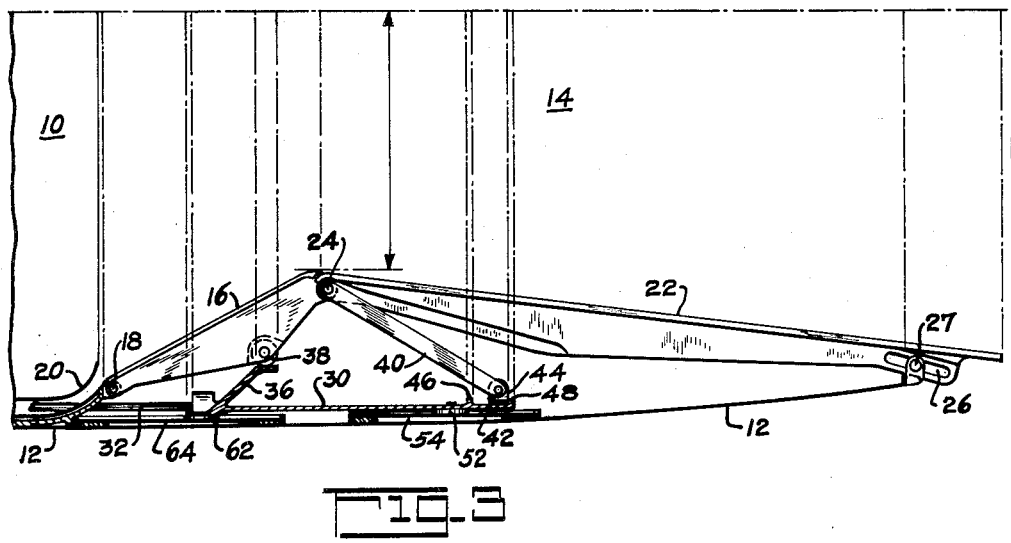
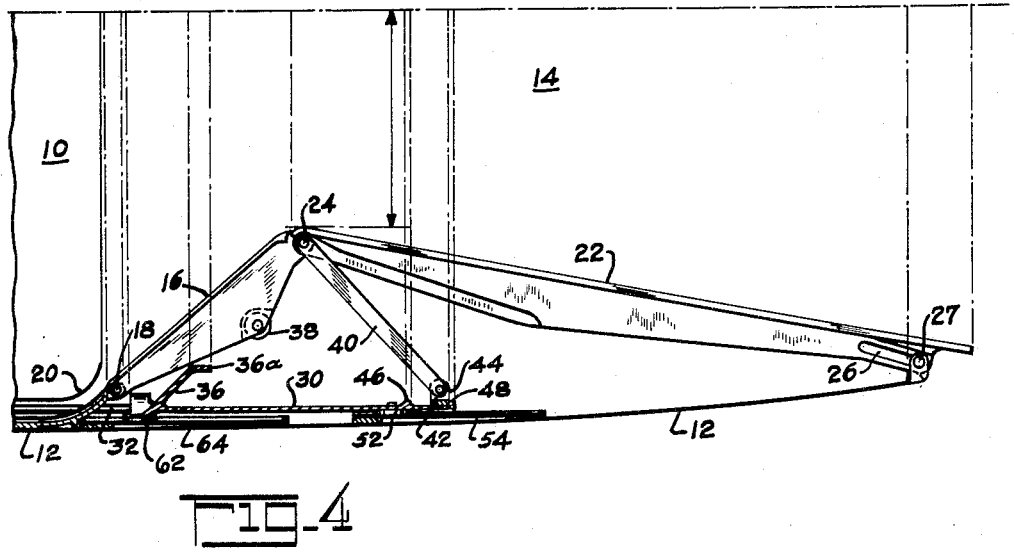

United States Patent Office 3,024,600
Patented Mar. 13, 1962

3,024,600
EXHAUST NOZZLE ACTUATOR
Ferdinand Peter Sollinger, Wayne, N.J., assignor to Curtiss-Wright Corporation, a corporation of Delaware
Filed July 22, 1959, Ser. No. 828,877
4 Claims. (Cl. 60—35.6)

This invention relates to improvements in jet engines' exhaust nozzles and is particularly directed to means for regulating the upstream and downstream nozzle members of a convergent-divergent exhaust nozzle whereby a predetermined throat area is available.

It is well known that aircraft jet engines of the turbojet or ramjet types may have a convergent-divergent profile in the exhaust nozzle to maintain maximum fuel economy and engine performance, especially in the case of engines designed for high speed flight. Such jet engines are generally operated so that the exhaust gas flows through the divergent portion of the nozzle at supersonic velocity. With such a convergent-divergent profile, the throat area of the nozzle is made adjustable for optimum or desired engine performance. The specific mechanism by which said adjustment is accomplished is the principal feature of this invention.

It is well known that in any jet engine there is only limited space to place the nozzle operating mechanism. Furthermore, with engines adapted to greater ranges and performance, the range of adjustment of the nozzle throat area for maximum engine efficiency increases beyond the capacity of available linkages or requires special designs of complicated mechanisms having high power requirements and in some cases, excessive weight.

The principal object of my invention is to provide an effective throat adjustment mechanism for a convergent-divergent jet engine nozzle which permits mounting in a minimum space within the engine housing without limiting the maximum diameter of the nozzle.

A further object of my invention is to provide an improved form of jet engine nozzle having a convergent-divergent profile in which throat size adjustments may be made with the most effective use of the applied force.

A more specific object of my invention is to provide improved nozzle adjustment connections including cams and links, for a jet engine nozzle whereby the cross section of the nozzle may be adjusted by utilizing, seriatim, the most effective characteristics of the cams and the links.

Other objects and advantages of my invention will appear from the following specification taken in connection with the attached drawings which is illustrative thereof, and in which:

FIG. 1 is a partial axial sectional view through a jet engine exhaust duct and variable area exhaust nozzle.

FIG. 2 is a partial axial sectional view on a larger scale through the exhaust nozzle showing the nozzle members in the position of maximum cross sectional area of the throat.

FIGS. 3 and 4 are partial axial sectional views similar to FIG. 2 showing the exhaust nozzle members in a position of intermediate cross sectional area of throat and minimum cross sectional area of throat respectively.

FIGS. 5, 6, and 7 are partial transverse cross sections taken on the lines 5—5, 6—6 and 7—7 respectively of FIG. 2 and showing details of construction.

Referring to FIG. 1 of the drawing, an aircraft jet engine exhaust duct is illustrated in part at 10, said duct being housed within and surrounded by the housing 12. The duct terminates in a variable area convergent-divergent exhaust nozzle 14 through which the aircraft jet engine exhaust gases discharge rearwardly to provide the engine with forward propulsive thrust.

The nozzle 14 has a plurality of nozzle members 16 arranged in a circumferential assembly and pivoted at their upstream ends 18 to a suitable part of the engine. Preferably, these nozzle members 16 hereinafter referred to as the upstream nozzle members, effectively form a continuation of the exhaust duct liner 20.

The nozzle 14 may also have a second series of nozzle members 22 similarly arranged in a circumferential assembly with their upstream ends pivoted to the upstream nozzle members as by the pivots 24. These nozzle members 22, hereinafter referred to as the downstream nozzle members, are floatingly supported at their downstream ends as by slotted connections 26 moving on rollers 27 carried by the housing 12.

The centrally pivoted transverse cross section of the exhaust nozzle 14 formed by the junction of the upstream nozzle members with respect to the downstream nozzle members becomes the throat of the nozzle. As will be seen from FIGS. 2, 3 and 4, the nozzle members may be moved from the maximum throat cross section position of FIG. 2, wherein the nozzle members are substantially parallel to the housing 12, up to a minimum throat cross section of FIG. 4 wherein the nozzle members are at a substantial angle to the housing 12.

While it is known that exhaust nozzles have been adjusted in throat size by links and cams as well as other mechanism, each of these has objectionable limitations and disadvantages. With a link for example, especially when the nozzle members are substantially parallel to the housing or at a relatively flat angle to the actuator link, an axially moving actuator has but a very small moment arm to cause a rotation of the nozzle members on their pivots. Furthermore, the nozzle member must be moved against substantial gas forces if the nozzle throat is to be reduced in size. On the other hand, cams are usually so limited by available space that only a limited opening can be accomplished with them.

My invention contemplates a novel adjustment mechanism for changing the exhaust throat area. Primarily, it consists of two sets of connecting members which transfer the movement of an annular axially movable ring member to the nozzle members. By providing suitable lost motion or follow-up connections, the movement of the annular ring from the maximum area throat opening position will cause the nozzle members to move through a so-called first range of movement to a position of intermediate throat area.

At the end of this first range of movement, the first set of connecting members becomes ineffective to cause further movement of the nozzle members toward their minimum throat area position. However, the follow up connection of the second set of connecting members now becomes effective and further movement of the annular ring in the same direction causes movement of the nozzle members through a second range of movement toward the minium throat area position through this second set of connecting members.

A preferred construction for accomplishing this action includes an annular slide ring 30 which is connected by rods 32 to a plurality of actuators 34. These actuators, which may be mechanical, electrical or hydraulic, may be actuated in accordance with desired engine conditions by automatic or manual controls (not shown). The movement of this ring 30 is limited to a fore and aft direction.

This annular slide ring 30 preferably has, as the first set of connecting members, an annular conical cam 36 which cooperates with the cam follower or rollers 38 of which there is one carried on each upstream nozzle member.

With the nozzle members in their maximum throat area position as shown in FIG. 2, the cam rollers 38 engage the maximum diameter portion of the cam surface 36. However, as soon as the annular slide ring 30 is moved in a forward or throat restricting direction, the cam rollers 38 move up the inclined cam surface until the nozzle members reach the intermediate throat position as is shown in FIG. 3. This constitutes the first operating range of nozzle movement. Any further movement of the slide ring 30 in the same direction will have no further effect on the nozzle members through the cam and cam follower as the cam rollers go off the cam into a lost motion position.

The second set of connecting members consists primarily of links 40 which, on one end, engage the pivoted central joints 24 of the nozzle members, such links being pivoted on the other end to an annular bracket ring 42 which has the brackets or ears 44. Preferably there is one link for each nozzle member. The bracket ring is mounted on the actuator slide ring 30 between forward abutment 46 and aft abutment 48 on the ring.

As indicated in FIG. 2, in the position of maximum throat opening of the nozzle members, the bracket ring 42 is substantially against the forward abutment 46 and, being spaced from the rear abutment 48, there is a substantial lost motion or follow up effect before the forward movement of the slide 30 will cause engagement of the rear abutment 48 with ring 42.

This lost motion or follow up effect is substantially equal to the travel of the annular ring 30 during the operative first range of movement of the cam rollers 38 on cam 36. At the position when the cam rollers 38 have reached the maximum lift of the cam, the slide ring 30 then transmits an axial force to the bracket ring 42 and links 40 through the abutment 48. Thereafter, further movement of the annular slide ring 30 in the same direction is through the so-called second operating range. During this movement, the nozzle members may be moved from the intermediate throat area position of FIG. 3 to the minimum throat area position of FIG. 4.

The utilization of two sets of connecting members each with the lost motion and follow-up provisions permits the most effective application of forces based on the arrangement of the parts. In the first range of movement for example, an axial movement of the annular ring member in the forward direction will provide a substantial moment arm rotating the nozzle members as a result of the size and shape of the cam and cam follower. Within the limits of the engine housing, however, the extent of rotation by any cam is limited.

Thereafter the second set of connecting link members becomes effective, and being effective on the partially rotated nozzle members, full advantage can be taken of the angular relation. As the annular ring member moves further forward through the second operating range, it will, through the second set of connecting link members, provide a substantial moment arm to complete the desired movement of the nozzle members about their pivots. As the throat area closes, the mechanical advantage of the toggle link connection increases and thus offsets the increasing gas load on the nozzle members. By a suitable proportion of the parts, the force required to move the annular ring through both operating ranges is nearly constant.

The return movement of the nozzle members from a minimum throat area as shown in FIG. 4 to a position of maximum throat area as shown in FIG. 2 is aided by the gas pressure on the nozzle members. However, forward abutment 46 on the ring 30 will, on rearward movement of the ring, open the nozzle members to the wide open position.

While the preferred form of embodiment of my invention contemplates the use of a cam and follower as the first connecting member and a link as the second connecting member between the actuating slide ring 30 and the nozzle members, it will be apparent that links and cams as defined herein are interchangeable to the extent that either may be substituted for the other and that either two cam systems or two link systems may be used. Furthermore, although the cam and cam follower are shown with respect to the upstream nozzle members, they may also be used as the connection with the downstream nozzle members. It will also be apparent that in the use of links it is most effective to attach one end to the common pivot between the upstream nozzle members and the downstream nozzle members, but it is also possible to hinge the links to other parts of the nozzle members. It is apparent that the cams and links disclosed will work equally well on a single assembly of nozzle members. In each case the cams and links at all times bring about a positive positioning of the nozzle members under control of the actuators.

The details of construction of the nozzle members and associated parts are shown in FIGS. 5, 6 and 7. The links 40 are shown in FIG. 5 as stacked between inverted portions of webs 50 of the downstream nozzle members. FIG. 5 also shows the rear inner edge 36a of the cam 36. The slide ring 30 is mounted on rollers 52 which are constrained to move in an axial direction by guides 54 mounted on the engine housing 12.

FIG. 6 is a section primarily showing the construction of the downstream nozzle members which have a gas contacting surface or shoe 56 supported by webs 50. The nozzle members in a circumferential series overlap each other with one set of alternate members in the series disposed radially inwardly of and overlapping the adjacent set. In this FIG. 6, the bracket ring 42 is shown with its spaced ears or brackets 44 to which the links 40 are pivoted. The slide ring 30 embraces the bracket ring 42, all being mounted within the engine housing 12.

The upstream nozzle members are shown in FIG. 7. These, too, have gas contacting surfaces or shoes 58 supported by webs 60. As with the downstream nozzle members, they are arranged in an overlapping circumferential series. In this figure, the guide rollers 62 are carried by guides 64 to assure fore and aft movement only. The rollers 38 are the cam rollers.

While I have described my invention in detail in its preferred embodiment, it will be obvious to those skilled in the art, after understanding my invention, that various changes and modifications may be made therein without departing from the spirit or scope thereof. I aim, in the appended claims, to cover all such modifications.

I claim as my invention:

1. A variable-area exhaust nozzle for a jet engine; said nozzle comprising a circumferential assembly of nozzle members pivotally supported at their upstream ends; annular means co-axially surrounding said circumferential assembly of nozzle members to form a shroud therefor; and means disposed in the space between said annular means and nozzle members for pivotally adjusting said nozzle members for varying the nozzle throat area; said nozzle adjusting means including cam means operatively connected to each nozzle member intermediate the ends of said nozzle member, link means operatively connected to the downstream end of each nozzle member, and means operatively associating said cam means and link means such that said cam means is effective only for pivotally moving said nozzle members in a first range between their positions for maximum throat area and their positions for an intermediate throat area and said link means is effective only for pivotally moving said nozzle members in a second range between their positions for said intermediate throat area and their positions for minimum throat area, said link means being ineffective in said first range and said cam means being ineffective in said second range.

2. A variable-area nozzle as claimed in claim 1 and including common actuating means operatively connected to said cam means and link means, said link having a lost-motion connection with said actuating means.

3. A variable-area nozzle as claimed in claim 2 in which said cam means is a single annular cam coaxial with the nozzle and each nozzle member has a cam follower for cooperation with said annular cam and in which said link means includes an individual link for each nozzle member.

4. A variable-area nozzle as claimed in claim 1 and in which the nozzle is a convergent-divergent nozzle and has a second circumferential assembly of nozzle members co-axial with the first-mentioned assembly of nozzle members, there being one nozzle member of said second assembly for each nozzle member of said first assembly with each of said second assembly nozzle members having its upstream end pivotally connected to the downstream end of the associated nozzle member of the first assembly, and further in which said annular means is fixed and surrounds both said first and second nozzle member assemblies with each second assembly nozzle member being connected at its downstream end to said annular means for relative pivotal movement and for relative movement in a direction parallel to the nozzle axis.

References Cited in the file of this patent

UNITED STATES PATENTS

| | | |
|---|---|---|
| 430,852 | Hellings | June 24, 1890 |
| 2,780,056 | Colley | Feb. 5, 1957 |
| 2,806,349 | Yeager | Sept. 17, 1957 |
| 2,934,966 | Wood | May 3, 1960 |